March 6, 1928. 1,662,020

E. W. ABRAM

TEAPOT, COFFEEPOT, AND THE LIKE

Filed March 15, 1927

INVENTOR
Edmund W. Abram
BY
Heard Smith & Tennant.
ATTORNEYS

Patented Mar. 6, 1928.

1,662,020

UNITED STATES PATENT OFFICE.

EDMUND WILLIAM ABRAM, OF LONDON, ENGLAND, ASSIGNOR TO EUGENE LUDLOW FONDEVILLE, OF NEW YORK, N. Y.

TEAPOT, COFFEEPOT, AND THE LIKE.

Application filed March 15, 1927, Serial No. 175,569, and in Great Britain March 17, 1926.

This invention has reference to tea pots, coffee pots or like pots or jugs and relates especially though not exclusively to a pot or jug, hereinafter referred to as a pot, of the type having at its upper end a lid which has an integral portion adapted to extend across said outlet and to form a shutter or partition serving to strain the liquid passing from the body of the pot to the said outlet or spout in pouring out.

Pots of this type are illustrated in my United States Patents Nos. 1,440,947 and 1,570,818.

One of the chief objects of the invention is to provide an improved form of removable straining shutter. Hitherto such shutters have been formed with perforations in the form of slots or holes but according to one feature of the invention an imperforate shutter is provided which simplifies and cheapens the cost of production. This shutter is so shaped as to abut against the wall of the pot but contrary to what might have been expected it has been found in practice that the liquid percolates sufficiently freely between the margin of the shutter and the pot to permit the pot to pour freely while at the same time straining the liquid. The straining action is improved by forming an inwardly projecting ledge such as hereinafter described and illustrated in the drawing upon the inner wall of the pot.

Another object of the invention is to provide improved means for automatically retaining a straining shutter whether perforate or imperforate in position during normal use of the pot. According to a further feature of the invention such means may comprise a ledge as above mentioned and a co-operating lug spaced therefrom upon the inner wall of the pot to engage beneath the margin of the shutter.

With these and other objects in view some of which are obvious and some of which will hereinafter appear the invention consists in the features and combinations of parts more specifically pointed out in the appended claims.

According to the embodiment of the invention selected for description and illustration a tea pot or the like is provided with an imperforate shutter or lid so arranged that the liquid in pouring out percolates through the interstice or interstices between the shutter and the pot. Preferably the pot is formed with an inwardly projecting ledge situated immediately above the shutter when the latter is in normal pouring position. Particularly when the pot is made in pottery, earthenware or the like the ledge and shutter may conveniently be formed with substantially flat adjacent surfaces between which the liquid will percolate, since in practice a liquid tight joint would never be made with such material.

The edge or edges of the shutter, and if desired the ledge and pot also may be specially shaped in order to provide for the sufficiently free flow of liquid and for preventing the interstice or interstices from becoming silted up with tea leaves or the like.

In order that the invention may be readily understood the same will now be described more fully with reference to the accompanying illustrative drawing.

In the accompanying drawing:—

Referring more particularly to the accompanying drawings in which similar reference characters refer to similar parts:—

Figure 1:
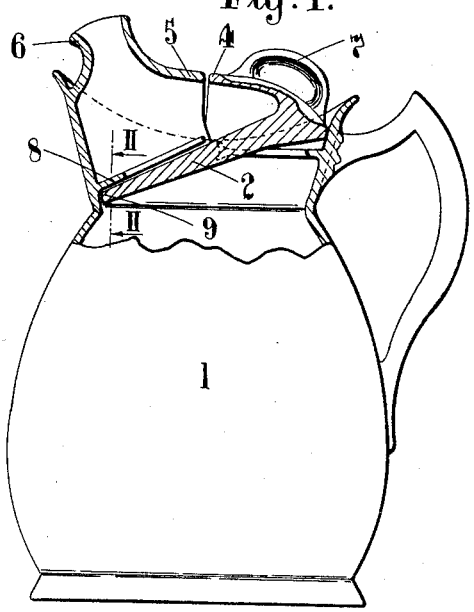
Fig. 1 is a part sectional elevation of a tea pot embodying the present invention.

1 indicates a tea, coffee or like pot, 2 indicates generally the removable shutter or lid, the effective imperforate shutter portion of which is indicated at 3, while 4 is a hood formed integral therewith adapted to abut against and complete a hood or cowl 5 in which is formed a spout 6.

The shutter or lid 2 is illustrated as provided with a knob 7 somewhat recessed at the sides, by means of which the shutter can be readily handled.

Figure 2:
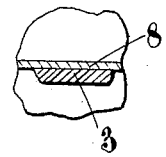
Fig. 2 is a section on the line II—II of Fig. 1.
Figure 3:
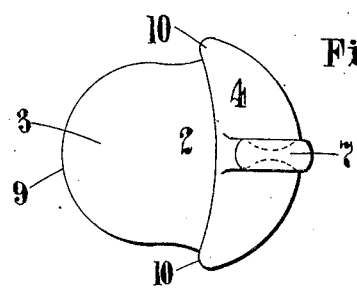
Fig. 3 is a plan view of the shutter or lid shown in Fig. 1.
Figure 5:
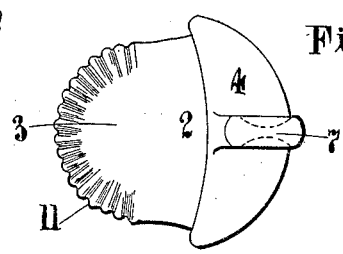
Fig. 5 is a fragmentary sectional view showing a slightly different construction from that shown in Fig. 1.

The pot 1 is shewn with an inwardly projecting ledge 8 extending partly around the pot and beneath which ledge the shutter 2 slides into position the upper edge of the imperforate portion 3 then abutting thereagainst as shewn in Fig. 2, and the outer edge 9 of the said portion abutting against the body of the pot 1. The hood 4 and particularly the shoulders 10 thereof are adapted to fit against or close to the hood or cowl 5 of the pot. In some cases it may happen that the hood 4 prevents the shutter 2 from sliding home far enough to cause the edge 9 to come into contact with the body of the pot but in any case it should lie in proximity thereto.

The ledge 8 and the upper edge of the portion 3 of the shutter as shewn in Figs. 1 and 2 present substantially flat adjacent surfaces between which liquid may percolate, after having percolated between the outer edge 9 of the shutter and the pot; thus an infusion such as tea prepared in the pot can be poured out through the spout 6 while the tea leaves are retained in the pot by the straining action of the imperforate shutter arranged as described.

Figure 4:
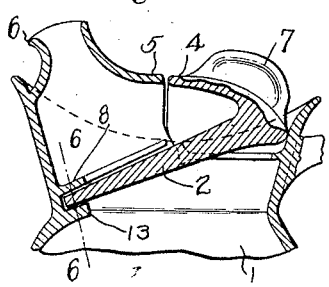
Fig. 4 is a plan view of a modified shutter or lid formed with grooves or corrugations at its forward and upper edges.
Figure 6:
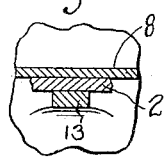
Fig. 6 is a section on the line 6—6, Fig. 5.

In some cases it may be found that the liquid does not pass sufficiently freely between substantially flat surfaces and in Fig. 4 is illustrated a shutter the appropriate edges of which are formed with grooves or corrugations 11 somewhat similar to those of an oyster shell. The grooves or corrugations have been somewhat exaggerated in the drawing for the purpose of clear illustration. The ledge 8 and even the body of the pot may be formed with similar grooves or corrugations.

It will be understood that the co-acting surfaces may be formed with a single groove or corrugation and indeed that many modifications may be made in their shape.

In order to facilitate the insertion of the shutter or lid, which is slid in over the rear edge of the pot, the ledge 8 is preferably inclined as illustrated. Also with this end in view the ledge may be curved upward at the rear, the shutter in that case being correspondingly curved.

It will be understood that this ledge 8 forms an abutment against which the shutter is held by the pressure of the liquid in pouring out thus to some extent preventing its displacement.

From the point of view of preventing the access of flies or other foreign matter the invention has particular application in the case of milk, which can be kept safely in a pot having a shutter or lid in accordance with the invention.

Although the shutter has been termed imperforate and in so far as the straining portion 3 thereof is concerned is so literally, it is not intended thereby to exclude the provision of a ventilating hole or opening at or about the rear of the lid, if found desirable, in order to permit air to enter the pot in pouring out.

In order that the shutter may be retained positively and automatically in position upon its insertion in the pot any appropriate means may be utilized. In accordance with one feature hereinbefore mentioned of the invention which is not confined to employment in conjunction with an imperforate shutter since the shutter might be perforate, a lug 13 projecting inwardly is formed on the wall of the pot and spaced from the ledge 8 a sufficient distance to accommodate the front margin of the shutter. The front edge of the shutter is thus more or less loosely gripped between the ledge and lug and displacement of the shutter and lid is prevented. The lower side of said lug is preferably curved to facilitate cleaning out the pot.

The pot and lid and shutter may be made in any suitable material, earthenware, china or the like being generally preferred though it can be made satisfactorily in metal either enamelled or not as desired.

I claim:—

1. In a tea, coffee or like pot having an outlet with a clear throughway at the upper front part of said pot, a removable imperforate shutter formed to extend across the said pot below said outlet and to abut against the wall of the pot, liquid flowing to the outlet when pouring out being strained by percolating between said shutter and the said wall.

2. In a tea, coffee or like pot having an outlet with a clear throughway at the upper part of said pot, a removable imperforate shutter formed to extend across the said pot below said outlet and to abut against the wall of the pot, and an inward projection on said wall and situated immediately above the shutter when the latter is in normal position, liquid flowing to the outlet when pouring out being strained by percolating between said shutter and said wall.

3. In a tea, coffee or like pot having an outlet with a clear throughway at the upper front part of said pot, a removable imperforate shutter formed to extend across the said pot below said outlet and to abut against the wall of the pot, and an inward projection in the form of a ledge extending partly around the pot formed on said wall and situated immediately above the shutter when the latter is in normal position, liquid flowing to the outlet when pouring out being strained by percolating through the interstices between the said shutter and said wall and ledge.

4. In a tea, coffee or like pot having an outlet with a clear throughway at the upper front part of said pot, a removable imperforate shutter formed to extend across the said pot below said outlet and to abut against the wall of the pot, and an inwardly projecting ledge extending partly around the pot and upwardly inclined toward the back of the pot formed on said wall and situated immediately above the shutter when the latter is in normal pouring position, liquid flowing to the outlet when pouring out being strained by percolating through the interstices between the said shutter and said wall and ledge.

5. In a tea, coffee or like pot having an outlet with a clear throughway at the upper front part of said pot, a removable imperforate shutter formed to extend across the said pot below said outlet and to abut against the wall of the pot, an inwardly projecting ledge formed on said wall and situated immediately above the shutter when the latter is in normal pouring position, the lower side of the said ledge and the upper edge of the said shutter presenting substantially flat adjacent surfaces and liquid flowing to the outlet when pouring out being strained by percolating through the interstices between the said shutter and said wall and ledge.

6. In a tea, coffee or like pot a hood at the upper front part of said pot, a spout with a clear throughway formed in said hood, the usual filling opening being to the rear of said hood, a removable lid for said filling opening and an imperforate straining shutter formed integrally with said lid, said shutter when in position extending in an oblique manner across the said pot below the spout and abutting against the wall of the pot, liquid flowing to the spout when pouring out being strained by percolating between said shutter and the said wall.

7. In a tea, coffee or like pot a hood at the upper front part of said pot, a spout with a clear throughway formed in said hood, the usual filling opening being to the rear of said hood, a removable lid for said filling opening, an imperforate shutter formed integrally with said lid, said shutter when in position extending in an oblique manner across the said pot below the spout and abutting against the wall of the pot and an inward projection on said wall and situated immediately above the shutter when the latter is in normal pouring position, liquid flowing to the spout when pouring out being strained by percolating between said shutter and said wall.

8. In a tea, coffee or like pot a hood at the upper front part of said pot, a spout with a clear throughway formed in said hood, the usual filling opening being to the rear of said hood, a removable lid for said filling opening, an imperforate straining shutter formed integrally with said lid, said shutter when in position extending in an oblique manner across the said pot below the spout and abutting against the wall of the pot, and an inwardly projecting ledge formed on said wall and situated immediately above the shutter when the latter is in normal pouring position, liquid flowing to the spout when pouring out being strained by percolating through the interstices between the said shutter and said wall and ledge.

9. In a tea, coffee or like pot a hood at the upper front part of said pot, a spout with a clear throughway formed in said hood, the usual filling opening being to the rear of said hood, a removable lid for said filling opening, an imperforate straining shutter formed integrally with said lid, said shutter when in position extending in an oblique manner across the said pot below the spout and abutting against the wall of the pot, and an inwardly projecting ledge formed on said wall and situated immediately above the shutter when the latter is in normal pouring position, the lower side of said ledge and the upper edge of said shutter presenting substantially flat adjacent surfaces and liquid flowing to the spout when pouring out being strained by percolating through the interstices between the said shutter and said wall and ledge.

10. As an article of manufacture for use in a tea, coffee or like pot a combined removable lid and imperforate straining shutter, a hood formed integrally with said lid and a finger grip integral with and facilitating the handling of said removable lid and shutter.

11. A tea, coffee or like pot comprising a hood at the upper front part of said pot, a spout with a clear throughway formed in said hood, the usual filling opening being to the rear of said hood, a removable straining shutter to fit in said pot and to serve as a lid for said filling opening, an inwardly projecting ledge formed on the wall of said pot positioned above the straining front portion of the shutter when the latter is in position and a co-operating inward projection on the pot spaced from said ledge to be below the front edge of said shutter, said ledge and said projection serving to prevent substantial displacement of the shutter in use.

12. A tea, coffee or like pot comprising a hood at the upper front part of said pot, a spout with a clear throughway formed in said hood, the usual filling opening being to the rear of said hood, a removable straining shutter to fit in said pot and to serve as a lid for said filling opening, an inwardly projecting ledge extending partly around the pot and upwardly inclined towards the rear formed on the wall of said pot positioned above the straining front portion of the shutter when the latter is in position and a cooperating inward projection on the pot spaced from said ledge to be below the front edge of said shutter, said ledge and said projection serving to prevent substantial displacement of the shutter in use.

13. A tea, coffee or like pot comprising a hood at the upper front part of said pot, a spout with a clear throughway formed in said hood, the usual filling opening being to the rear of said hood, a removable straining shutter to fit in said pot and to serve as a lid for said filling opening, an inwardly projecting ledge formed on the wall of said pot positioned above the straining front portion of the shutter when the latter is in position and an inwardly projecting lug on said wall spaced from and below said ledge, said ledge and said lug serving as means automatically guiding the shutter into position and retaining it therein.

14. A tea, coffee or like pot comprising an outlet formed at the upper front part of said pot, a filling opening, a removable straining shutter shaped to fit in said pot below said outlet, a lid for said filling opening formed integrally with said shutter, an inwardly projecting ledge below said outlet extending partly around the pot and upwardly inclined towards the rear, said ledge being situated above the shutter when the latter is in position, and an inward projection on said pot spaced below said ledge a sufficient distance to accommodate the front edge of the shutter.

15. A tea, coffee or like pot comprising an outlet formed at the upper front part and an outwardly curved front wall forming a belly below said outlet, a removable imperforate straining shutter formed to fit in said pot below said outlet but above said belly and guiding and retaining means inside the pot, said means serving automatically to position the said shutter upon insertion thereof.

In testimony whereof, I have signed this specification.

EDMUND WILLIAM ABRAM.